United States Patent
Ueda et al.

(10) Patent No.: US 10,465,959 B2
(45) Date of Patent: Nov. 5, 2019

(54) REFRIGERANT CIRCULATION DEVICE, METHOD FOR CIRCULATING REFRIGERANT AND METHOD FOR SUPPRESSING ISOMERIZATION

(71) Applicants: MITSUBISHI HEAVY INDUSTRIES THERMAL SYSTEMS, LTD., Tokyo (JP); CENTRAL GLASS CO., LTD., Ube-shi, Yamaguchi (JP)

(72) Inventors: Kenji Ueda, Tokyo (JP); Naoki Kobayashi, Tokyo (JP); Yoshinori Akamatsu, Tokyo (JP); Fuyuhiko Sakyu, Tokyo (JP); Yoshio Nishiguchi, Saitama (JP)

(73) Assignees: MITSUBISHI HEAVY INDUSTRIES THERMAL SYSTEMS, LTD., Tokyo (JP); CENTRAL GLASS CO., LTD., Ube-Shi, Yamaguchi (JP)

(*) Notice: Subject to any disclaimer, the term of this patent is extended or adjusted under 35 U.S.C. 154(b) by 616 days.

(21) Appl. No.: 14/914,519

(22) PCT Filed: Oct. 23, 2014

(86) PCT No.: PCT/JP2014/078251
§ 371 (c)(1),
(2) Date: Feb. 25, 2016

(87) PCT Pub. No.: WO2015/060400
PCT Pub. Date: Apr. 30, 2015

(65) Prior Publication Data
US 2016/0200955 A1    Jul. 14, 2016

(30) Foreign Application Priority Data
Oct. 25, 2013    (JP) .................... 2013-222325

(51) Int. Cl.
*F25B 49/00*    (2006.01)
*F25B 43/00*    (2006.01)
(Continued)

(52) U.S. Cl.
CPC ............ *F25B 49/005* (2013.01); *C09K 5/044* (2013.01); *C09K 5/045* (2013.01); *F25B 43/00* (2013.01);
(Continued)

(58) Field of Classification Search
CPC combination set(s) only.
See application file for complete search history.

(56) References Cited

U.S. PATENT DOCUMENTS 7,282,601 B2 * 10/2007 Kawahara ............... C07C 69/75
560/127
2002/0023448 A1    2/2002 Ito et al.
(Continued)

FOREIGN PATENT DOCUMENTS

CN    1404569 A    3/2003
CN    101573564 A    11/2009
(Continued)

OTHER PUBLICATIONS

WO-2010047116-A1 translation.*
(Continued)

*Primary Examiner* — Elizabeth J Martin
(74) *Attorney, Agent, or Firm* — Birch, Stewart, Kolasch & Birch, LLP (57) ABSTRACT

A heat pump device and an organic Rankine cycle device that are capable of maintaining a stable thermal cycle even when an HFO or HCFO is used as the refrigerant. The refrigerant circulation device uses a refrigerant, wherein the refrigerant includes a hydrofluoroolefin or hydrochlorofluoroolefin having a carbon-carbon double bond within the (Continued)

molecular structure, and a reaction suppression unit which suppresses an isomerization reaction of the refrigerant is provided within the refrigerant circulation circuit.

18 Claims, 8 Drawing Sheets

(51) Int. Cl.
  *C09K 5/04* (2006.01)
  *F25B 30/02* (2006.01)
(52) U.S. Cl.
  CPC .. *C09K 2205/122* (2013.01); *C09K 2205/126* (2013.01); *F25B 30/02* (2013.01); *F25B 2400/121* (2013.01)

(56) References Cited

U.S. PATENT DOCUMENTS

| | | |
|---|---|---|
| 2003/0140649 A1 | 7/2003 | Suzuki et al. |
| 2004/0119047 A1 | 6/2004 | Singh et al. |
| 2006/0243944 A1 | 11/2006 | Minor et al. |
| 2006/0243945 A1 | 11/2006 | Minor et al. |
| 2008/0103342 A1 | 5/2008 | Wang et al. |
| 2008/0230738 A1 | 9/2008 | Minor et al. |
| 2009/0120619 A1 | 5/2009 | Sievert et al. |
| 2009/0211734 A1 | 8/2009 | Benstead et al. |
| 2009/0249809 A1 | 10/2009 | Minor et al. |
| 2009/0249864 A1 | 10/2009 | Minor et al. |
| 2009/0250650 A1 | 10/2009 | Minor et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |
| 2010/0012302 A1 | 1/2010 | Clodic et al. |
| 2010/0152504 A1 | 6/2010 | Hulse et al. |
| 2011/0023535 A1 | 2/2011 | Morimoto et al. |
| 2011/0185765 A1 | 8/2011 | Nishii et al. |
| 2011/0197616 A1 | 8/2011 | Nishii et al. |
| 2011/0204279 A1 | 8/2011 | Minor et al. |
| 2011/0290447 A1 | 12/2011 | Clodic et al. |
| 2012/0117991 A1 | 5/2012 | Rached |
| 2012/0131947 A1 | 5/2012 | Nakano et al. |
| 2012/0256120 A1 | 10/2012 | Bouvier et al. |
| 2012/0304687 A1 | 12/2012 | Sato et al. |
| 2012/0324926 A1 | 12/2012 | Rached et al. |
| 2013/0098101 A1* | 4/2013 | Ishida .................. C09K 5/045 62/468 |
| 2014/0070132 A1 | 3/2014 | Fukushima |
| 2014/0077122 A1* | 3/2014 | Fukushima .......... C09K 5/044 252/67 |
| 2014/0174084 A1 | 6/2014 | Kontomaris |
| 2014/0283537 A1 | 9/2014 | Minor et al. |
| 2016/0017231 A1 | 1/2016 | Singh et al. |
| 2016/0115827 A1 | 4/2016 | Rached |

FOREIGN PATENT DOCUMENTS

| | | |
|---|---|---|
| CN | 102203526 A | 9/2011 |
| CN | 102471671 A | 5/2012 |
| EP | 2 339 271 A1 | 6/2011 |
| GB | 296498 A | 9/1928 |
| JE | 2010-121927 A | 6/2010 |
| JP | 7-018173 U | 3/1995 |
| JP | 7-294066 A | 11/1995 |
| JP | 2006-089801 A | 4/2006 |
| JP | 2006-512426 A | 4/2006 |
| JP | 2007-315663 A | 12/2007 |
| JP | 2008-110979 A | 5/2008 |
| JP | 2008-531836 A | 8/2008 |
| JP | 2008-544072 A | 12/2008 |
| JP | 2009-222329 A | 10/2009 |
| JP | 2010-012927 A | 1/2010 |
| JP | 2010-526982 A | 8/2010 |
| JP | 2010-203759 A | 9/2010 |
| JP | 2010-210224 A | 9/2010 |
| JP | 2010-235950 A | 10/2010 |
| JP | 2010-236725 A | 10/2010 |
| JP | 2010-236726 A | 10/2010 |
| JP | 2010-243148 A | 10/2010 |
| JP | 4571183 B2 | 10/2010 |
| JP | 2010-265429 A | 11/2010 |
| JP | 2011-226728 A | 11/2011 |
| JP | 2011-237146 A | 11/2011 |
| JP | 2012-012532 A | 1/2012 |
| JP | 2013-525720 A | 6/2013 |
| WO | WO 2007/002625 A2 | 1/2007 |
| WO | WO-2010047116 A1 * | 4/2010 ............. C09K 5/045 |
| WO | WO 2012/001842 A1 | 1/2012 |
| WO | WO 2012/157762 A1 | 11/2012 |
| WO | WO 2012/157763 A1 | 11/2012 |
| WO | WO 2012/157764 A1 | 11/2012 |
| WO | WO 2013/028476 A2 | 2/2013 |

OTHER PUBLICATIONS

International Search Report (PCT/ISA/210) issued in PCT/JP2014/078251, dated Jan. 27, 2015.
Written Opinion (PCT/ISA/237) issued in PCT/JP2014/078251, dated Jan. 27, 2015.
Extended European Search Report, dated Jul. 29, 2016, for European Application No. 14855304.3.
Extended European Search Report, dated Jul. 29, 2016, for European Application No. 14855590.7.
Chinese Office Action and Chinese Search Report, dated Nov. 28, 2016, for Chinese Application No. 201480046122.2 with English translations.
Office Action dated Apr. 10, 2017 received in related U.S. Appl. No. 14/914,589.
State Intellectual Property Office of People's Republic of China, "First Office Action," issued in connection with Chinese Patent Application No. 201480046121.8, dated Jan. 22, 2017.

* cited by examiner

FIG. 13

REFRIGERANT CIRCULATION DEVICE, METHOD FOR CIRCULATING REFRIGERANT AND METHOD FOR SUPPRESSING ISOMERIZATION

TECHNICAL FIELD

The present invention relates to a refrigerant circulation device that uses a refrigerant, a method for circulating a refrigerant and a method for suppressing isomerization, and relates particularly to a heat pump device, an organic Rankine cycle device, and a method for circulating a refrigerant and a method for suppressing isomerization that use these devices.

BACKGROUND ART

Conventionally, hydrofluorocarbon (HFC) based refrigerants have been used as the refrigerants for heat pump devices and organic Rankine cycle devices. HFC-based refrigerants have an ozone layer depletion coefficient of zero, and have high thermal stability. However, HFC-based refrigerants have an extremely high global warming potential (GWP). As a result, the use of HFC-based refrigerants is undesirable from the viewpoint of global environmental protection.

Examples of known refrigerants having a low GWP include hydrofluoroolefin (HFO) and hydrochlorofluoroolefin (HCFO) based refrigerants. Patent Literature 1 (PTL 1) discloses a refrigeration cycle device which uses a refrigerant containing mainly an HFO. In PTL 1, the compound 2,3,3,3-tetrafluoro-1-propene (HFO1234yf) is used as the HFO-based refrigerant.

Isomers exist for some HFO and HCFO compounds. For example, a regioisomer 1,3,3,3-tetrafluoro-1-propene (HFO1234ze) exists for HFO1234yf. Further, for HFO1234ze, the cis-trans isomers of HFO1234ze(Z) and HFO1234ze(E) exist.

CITATION LIST

Patent Literature

{PTL 1} PCT International Publication No. WO 2012/001842

SUMMARY OF INVENTION

Technical Problem

HFO and HCFO compounds have a carbon-carbon double bond within the molecular structure, and therefore have lower stability than HFC compounds. Among HFO and HCFO compounds, there are some compounds which have cis and trans geometric isomers. It is known that, generally, in the case of HFO and HCFO compounds having cis-trans isomers, one geometric isomer adopts a more stable structure than the other geometric isomer. For example, in the case of HFO1234ze, the trans isomer has a more stable structure than the cis isomer. If the stability of a refrigerant is low, then the physical properties of the refrigerant may sometimes change during the thermal cycle. If the physical properties of the refrigerant during the thermal cycle differ from the physical properties of the refrigerant during refrigerant filling, then a stable thermal cycle cannot be maintained. Accordingly, although HFO and HCFO compounds, and particularly HFO cis isomers and HCFO cis isomers, exhibit excellent thermophysical properties and characteristics, because of these changes in the physical properties, use of these compounds as refrigerants is often problematic.

In heat pump devices and organic Rankine cycle devices, heat exchange is performed between a refrigerant and a heating medium. If the boiling point of the refrigerant is lower than the temperature of the heating medium, then unless a tougher device is constructed, there is a limit to the heat exchange efficiency. Accordingly, it is desirable that the boiling point of the refrigerant is as close as possible to the temperature of usable heating media. In heat pump devices, external air or water is used as the heating medium.

The boiling point of HFO1234yf is −29° C. HFO1234ze has a higher boiling point than HFO1234yf. The boiling point of HFO1234ze(Z) is +10° C., which is higher than the boiling point of HFO1234ze(E) (b.p. −19° C.). In this manner, with HFO and HCFO compounds that have geometric isomers, the geometric isomer that adopts the more unstable structure has a higher boiling point than the other geometric isomer. From the viewpoint of the heat exchange efficiency, among HFO and HCFO compounds, the cis isomer sometimes exhibits superior performance as a refrigerant. In particular, in the case of heat pump devices and organic Rankine cycle devices which use a heat source of 80° C. or higher, the cis isomer, which has a higher boiling point than the trans isomer, may exhibit superior performance as a refrigerant, and therefore it is desirable to improve the stability of these cis isomers (HFO-cis isomers and HCFO-cis isomers).

The present invention has been developed in light of these circumstances, and has an object of providing a heat pump device and an organic Rankine cycle device that are capable of maintaining a stable thermal cycle even when an HFO or HCFO, and particularly an HFO-cis isomer or HCFO-cis isomer, is used as the refrigerant, and also providing a method for circulating a refrigerant and a method for suppressing isomerization that use these devices.

Solution to Problem

In order to achieve the above object, a refrigerant circulation device, a method for circulating a refrigerant and a method for suppressing isomerization according to the present invention adopt the aspects described below.

The present invention provides a refrigerant circulation device that uses a refrigerant, wherein the refrigerant comprises a hydrofluoroolefin or hydrochlorofluoroolefin having a carbon-carbon double bond within the molecular structure, and a reaction suppression unit which suppresses an isomerization reaction of the refrigerant is provided within the refrigerant circulation circuit.

Further, the present invention also provides a method for suppressing isomerization in a refrigerant circulation device that uses a refrigerant, wherein the refrigerant comprises a hydrofluoroolefin or hydrochlorofluoroolefin having a carbon-carbon double bond within the molecular structure, and a reaction suppression unit containing a reaction-suppressing material that suppresses an isomerization reaction of the refrigerant is provided within the refrigerant circulation circuit, the method comprising bringing the refrigerant into contact with the reaction-suppressing material.

Furthermore, the present invention also provides a method for circulating a refrigerant in a refrigerant circulation device that uses the refrigerant, wherein the refrigerant comprises a hydrofluoroolefin or hydrochlorofluoroolefin having a carbon-carbon double bond within the molecular structure, and a reaction suppression unit containing a reaction-suppressing material that suppresses an isomerization reaction of the refrigerant is provided within the refrigerant circulation circuit, the method comprising bringing the refrigerant into contact with the reaction-suppressing material.

According to the present invention, by providing the reaction suppression unit within the refrigerant circulation circuit (thermal cycle), the isomerization reaction of the refrigerant can be suppressed. As a result, changes in the thermophysical properties of the refrigerant are inhibited, and a stable refrigerant circulation circuit can be maintained. An isomerization reaction means a reaction in which a hydrofluoroolefin (HFO) or hydrochlorofluoroolefin (HCFO) having a plurality of isomers undergoes a structural change to a form a different isomer from the target isomer. During the refrigerant circulation, the refrigerant may be heated and/or cooled, and may be pressurized and/or placed under reduced pressure.

In one aspect of the invention described above, the refrigerant preferably comprises a hydrofluoroolefin or hydrochlorofluoroolefin having a carbon-carbon double bond within the molecular structure as the main component.

If the target compound for which isomerization can be suppressed by the reaction suppression unit exists in a large amount, then the effect of the invention in stabilizing the refrigerant is more pronounced.

In one aspect of the invention described above, the refrigerant preferably comprises the cis isomer of a hydrofluoroolefin or hydrochlorofluoroolefin having a carbon-carbon double bond within the molecular structure as the main component.

In one aspect of the invention described above, the reaction suppression unit preferably suppresses the isomerization reaction of the cis isomer of the refrigerant to the trans isomer.

The cis isomer undergoes isomerization to form the trans isomer. By suppressing the isomerization reaction from the cis isomer to the trans isomer, the boiling point of the refrigerant can be maintained at a high value.

In one aspect of the invention described above, the reaction suppression unit preferably contains a reaction-suppressing material containing mainly at least one material selected from the group consisting of copper, iron, aluminum, nickel, titanium, metallic silicon, silicon steel, tin, magnesium, zinc and zeolite.

The reaction-suppressing material preferably comprises either a structure containing a mixture of copper, iron and aluminum, or aluminum as the main component.

A reaction-suppressing material comprising mainly a material selected from those listed above can suppress the isomerization reaction of the hydrofluoroolefin or hydrochlorofluoroolefin during the thermal cycle.

In one aspect of the invention described above, the reaction-suppressing material is preferably a porous structure, a mesh structure or a corrugated structure.

By using a reaction-suppressing material having the type of structure described above, the contact surface area between the refrigerant and the reaction-suppressing material increases. As a result, the isomerization reaction of the hydrofluoroolefin or hydrochlorofluoroolefin can be better suppressed.

In one aspect of the invention described above, the refrigerant circulation device has a region in the refrigerant circulation circuit where the temperature of the refrigerant reaches 175° C. or higher, and the reaction suppression unit is preferably provided in this region where the temperature of the refrigerant is able to reach 175° C. or higher.

The inventors of the present invention discovered that with the cis isomer of a hydrofluoroolefin or hydrochlorofluoroolefin, when the refrigerant temperature reaches a temperature of 175° C. or higher, the isomerization reaction tends to accelerate. According to the aspect of the invention described above, by providing the reaction suppression unit in the region where the isomerization reaction is most likely to occur, the isomerization reaction of the hydrofluoroolefin or hydrochlorofluoroolefin can be suppressed efficiently.

In one aspect of the invention described above, the refrigerant circulation device comprises a compressor which compresses the refrigerant, a condenser which condenses the compressed refrigerant, an expansion valve which expands the condensed refrigerant, and an evaporator which evaporates the expanded refrigerant, wherein the reaction suppression unit can be provided in a region from the compressor to the condenser.

In a refrigerant circulation circuit comprising a compressor, a condenser, an expansion valve and an evaporator connected in sequence, the region from the compressor to the condenser is a high-temperature, high-pressure environment where the refrigerant exists as a gas, and is therefore the region where the isomerization reaction can proceed most readily. In the aspect of the invention described above, by providing the reaction suppression unit in the region from the compressor to the condenser, the isomerization reaction of the cis isomer of the hydrofluoroolefin or hydrochlorofluoroolefin can be suppressed in the region where the isomerization reaction proceeds most readily.

In one aspect of the invention described above, the refrigerant circulation device comprises a compressor which compresses the refrigerant, a condenser which condenses the compressed refrigerant, an expansion valve which expands the condensed refrigerant, and an evaporator which evaporates the expanded refrigerant, wherein the reaction suppression unit can be provided in a region from the condenser to the expansion valve.

In a refrigerant circulation device, the refrigerant is condensed by the condenser and becomes a liquid. The liquefied refrigerant occupies a smaller volume than the gaseous refrigerant. According to the aspect of the invention described above, by providing the reaction suppression unit in the region from the condenser to the expansion valve, a larger proportion of the refrigerant can be brought into contact with the reaction-suppressing material.

In one aspect of the invention described above, the reaction suppression unit may be integrated within the condenser.

Pressure from the refrigerant acts upon the structural elements of the refrigerant circulation device. As a result, the structural elements of the refrigerant circulation device must have sufficient rigidity to be able to withstand this pressure from the refrigerant. According to the aspect of the invention described above, by integrating the reaction suppression unit within the condenser, there is no need to provide a new pressure-resistant container. Accordingly, the refrigerant circulation device can be lightened.

In one aspect of the invention described above, the refrigerant circulation device comprises a pump which force feeds the refrigerant, an evaporator which heats and evaporates the force fed refrigerant using a heat source, an expansion device which expands the evaporated refrigerant, and a condenser which condenses the expanded refrigerant, wherein the reaction suppression unit can be provided in the region from the evaporator to the expansion device.

In a refrigerant circulation circuit comprising a pump, an evaporator, an expansion device and a condenser connected in sequence, the region from the evaporator to the expansion device is a high-temperature, high-pressure environment where the refrigerant exists as a gas, and is therefore the region where the isomerization reaction can proceed most readily. In the aspect of the invention described above, by providing the reaction suppression unit in the region from the evaporator to the expansion device, the isomerization reaction of the cis isomer of the hydrofluoroolefin or hydrochlorofluoroolefin can be better suppressed.

Advantageous Effects of Invention

In the refrigerant circulation device, the method for circulating a refrigerant and the method for suppressing isomerization according to the present invention, by providing a reaction suppression unit, the isomerization reaction of the HFO or HCFO within the refrigerant circulation circuit can be suppressed. As a result, changes in the thermophysical properties of the refrigerant are suppressed, and a stable refrigerant circulation circuit can be maintained.

DESCRIPTION OF EMBODIMENTS

First Embodiment

Figure 1:
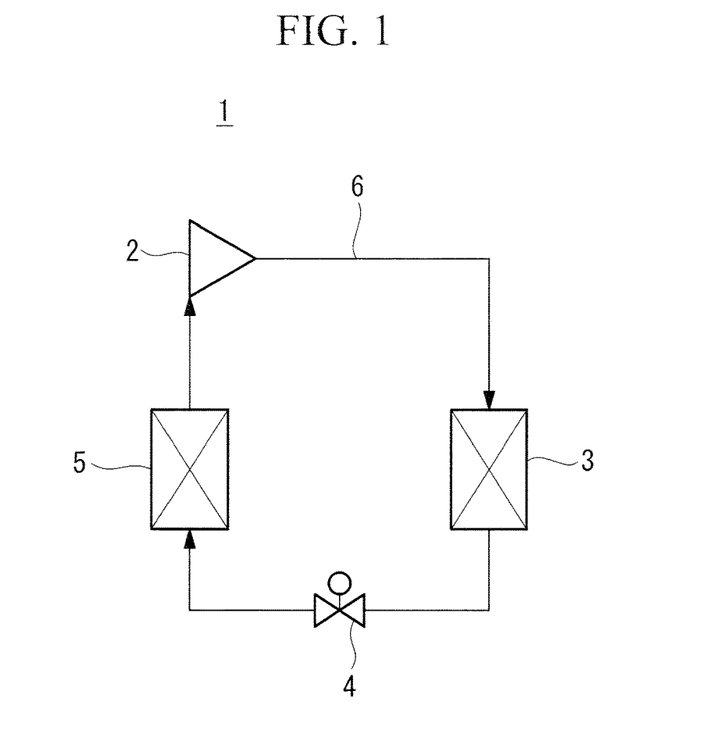
FIG. 1 A schematic structural diagram illustrating one example of a heat pump device according to a first embodiment.
Figure 2:
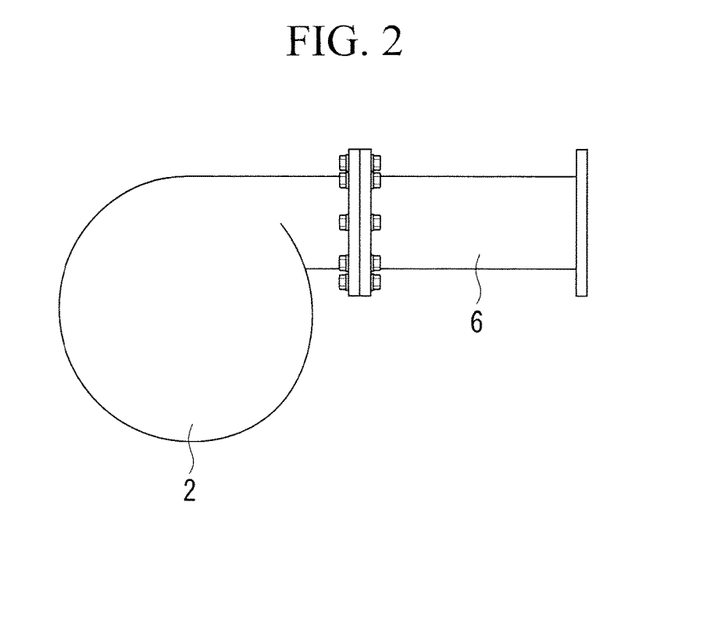
FIG. 2 A side view of the reaction suppression unit shown in FIG. 1.
Figure 3:
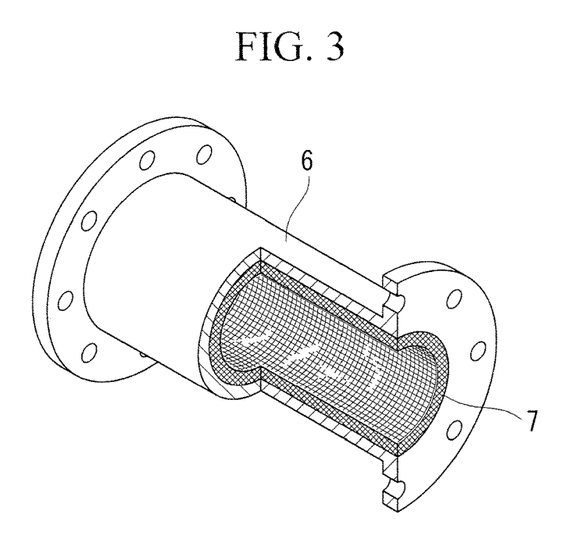
FIG. 3 A perspective view of the reaction suppression unit shown in FIG. 1.

FIG. 1 is a schematic structural diagram illustrating one example of a heat pump device (refrigerant circulation device) according to this embodiment. FIG. 2 is a side view of the reaction suppression unit of FIG. 1. FIG. 3 is a perspective view of the reaction suppression unit of FIG. 1.

The heat pump device 1 comprises a compressor 2, a condenser 3, an expansion valve 4, an evaporator 5 and a reaction suppression unit 6. The compressor 2, the condenser 3, the expansion valve 4 and the evaporator 5 form a refrigerant circulation circuit (heat pump cycle) connected in sequence by a series of pipes. Each of the structural members of the heat pump device 1 are designed to be able to withstand the pressure from the refrigerant. The refrigerant fills the inside of the heat pump cycle.

The compressor 2 receives the refrigerant flowing from the evaporator 5, and following compression, discharges the compressed refrigerant toward the condenser 3. The compressor 2 can increase the temperature of the refrigerant to 175° C. or higher. The compressor 2 may employ a conventional device such as a turbo compressor or the like. The compressor 2 may be a multi-stage compressor. A plurality of compressors 2 may be provided.

The compressor 2 comprises an inlet port through which the refrigerant is received, and a discharge port through which the compressed refrigerant is discharged. A discharge pipe for discharging the compressed refrigerant gas toward the condenser 3 is connected to the discharge port of the compressor 2.

The condenser 3 cools and condenses the refrigerant that has been compressed by the compressor 2, enabling the formation of a refrigerant liquid. The condenser 3 may be a plate heat exchanger or a shell and tube heat exchanger or the like. Either a single condenser or a plurality of condensers may be provided as the condenser 3. The condenser 3 comprises an inflow pipe through which the compressed refrigerant enters, and an outflow pipe through which the refrigerant that has been condensed by the condenser 3 is discharged.

The expansion valve 4 is a valve that subjects the refrigerant liquid that has been condensed by the condenser 3 to adiabatic expansion and pressure reduction. A conventional expansion valve may be used as the expansion valve 4.

The evaporator 5 evaporates the refrigerant liquid that has undergone adiabatic expansion in the expansion valve 4. The evaporator 5 may be formed from a plate heat exchanger or a shell and tube heat exchanger or the like.

The refrigerant used to fill the inside of the heat pump cycle comprises a hydrofluoroolefin (HFO) or hydrochlorofluoroolefin (HCFO) having a carbon-carbon double bond within the molecular structure. The refrigerant preferably comprises the hydrofluoroolefin (HFO) or hydrochlorofluoroolefin (HCFO) as the main component. The hydrofluoroolefin (HFO) or hydrochlorofluoroolefin (HCFO) typically represents more than 50 GC %, preferably more than 75 GC %, and still more preferably more than 90 GC %, of the refrigerant. The hydrofluoroolefin (HFO) or hydrochlorofluoroolefin (HCFO) is preferably a cis isomer.

Specifically, examples of the hydrofluoroolefin (HFO) include (Z)-1,3,3,3-tetrafluoro-1-propene (HFO1234ze(Z)), (Z)-1,2,3,3,-tetrafluoro-1-propene (HFO1234ye(Z)), (Z)-1,2,3,3,3-pentafluoro-1-propene (HFO1225ye(Z)), (Z)-1,1,1,4,4,4-hexafluoro-2-butene (HFO1336mzz(Z)), (E)-1,3,3,3-tetrafluoro-1-propene (HFO1234ze(E)), (E)-1,2,3,3,-tetrafluoro-1-propene (HFO1234ye(E)), (E)-1,2,3,3,3-pentafluoro-1-propene (HFO1225ye(E)), and (E)-1,1,1,4,4,4-hexafluoro-2-butene (HFO1336mzz(E)).

Specifically, examples of the hydrochlorofluoroolefin (HCFO) include (Z)-1-chloro-3,3,3-trifluoropropene (HCFO1233zd(Z)) and (E)-1-chloro-3,3,3-trifluoropropene (HCFO1233zd(E)).

The purity of the hydrofluoroolefin (HFO) or hydrochlorofluoroolefin (HCFO) is preferably at least 97 GC %, more preferably 99 GC % or higher, and still more preferably 99.9 GC % or higher.

The refrigerant may contain one or more additives. Examples of these additives include halocarbons, other hydrofluorocarbons (HFC), alcohols, and saturated hydrocarbons.

<Halocarbons and Other Hydrofluorocarbons>

Examples of the halocarbons include compounds containing one or more halogen atoms such as methylene chloride, trichloroethylene and tetrachloroethylene.

Examples of the hydrofluorocarbons include difluoromethane (HFC-32), 1,1,1,2,2-pentafluoroethane (HFC-125), fluoroethane (HFC-161), 1,1,2,2-tetrafluoroethane (HFC-134), 1,1,1,2-tetrafluoroethane (HFC-134a), 1,1,1-trifluoroethane (HFC-143a), difluoroethane (HFC-152a), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), 1,1,1,2,3-pentafluoropropane (HFC-245eb), 1,1,2,2,3-pentafluoropropane (HFC-245ca), 1,1,1,3,3-pentafluorobutane (HFC-365mfc), 1,1,1,3,3,3-hexafluoroisobutane (HFC-356mmz), and 1,1,1,2,2,3,4,5,5,5-decafluoropentane (HFC-43-10-mee).

<Alcohols>

Examples of the alcohols include alcohols having a carbon number of 1 to 4 such as methanol, ethanol, n-propanol, i-propanol, n-butanol, i-butanol, 2,2,2-trifluoroethanol, pentafluoropropanol, tetrafluoropropanol, and 1,1,1,3,3,3-hexafluoro-2-propanol.

<Saturated Hydrocarbons>

The saturated hydrocarbon may be a mixture of one or more compounds having a carbon number of at least 3 but not more than 8 selected from the group consisting of propane, n-butane, i-butane, neopentane, n-pentane, i-pentane, cyclopentane, methylcyclopentane, n-hexane and cyclohexane. Among these, particularly preferred compounds include neopentane, n-pentane, i-pentane, cyclopentane, methylcyclopentane, n-hexane and cyclohexane.

The reaction suppression unit 6 suppresses the isomerization reaction of the refrigerant. The reaction suppression unit 6 is provided in the region where the temperature of the refrigerant can reach 175° C. or higher. In the present embodiment, the region where the temperature of the refrigerant can reach 175° C. or higher is the region from the compressor 2 to the condenser 3. The reaction suppression unit 6 includes at least a portion of the pipes connecting the compressor 2 and the condenser 3. The reaction suppression unit 6 preferably includes all of the pipes connecting the compressor 2 and the condenser 3. In FIG. 2, the reaction suppression unit 6 is connected directly to the discharge port of the compressor 2.

The reaction suppression unit 6 contains a first reaction-suppressing material. The first reaction-suppressing material comprises at least one material selected from the group consisting of copper, iron, aluminum, nickel, titanium, metallic silicon, silicon steel, tin, magnesium, zinc and zeolite as the main component. The term "main component" means the component that exist in the largest amount. The first reaction-suppressing material is preferably a structure containing a mixture of copper, iron and aluminum. The first reaction-suppressing material may also be stand-alone aluminum or zeolite.

By selecting the first reaction-suppressing material from the materials mentioned above, the isomerization reaction of the refrigerant can be suppressed. A first reaction-suppressing material selected from the materials listed above can be used in a high-temperature environment of 175° C. or higher.

The first reaction-suppressing material is preferably used in a state where the main component of the first reaction-suppressing material is clearly exposed at the material surface.

The first reaction-suppressing material preferably has a porous structure, a mesh structure or a corrugated structure. The first reaction-suppressing material may also be composed of a plurality of thin plate-like structures arranged in parallel along the direction of flow of the refrigerant (gas). By increasing the surface area across which the first reaction-suppressing material can contact the refrigerant, and ensuring that the first reaction-suppressing material does not inhibit the refrigerant flow, the isomerization reaction of the refrigerant can be suppressed efficiently, and pressure loss can also be suppressed.

In the present embodiment, the first reaction-suppressing material is disposed inside the reaction suppression unit 6. For example, as illustrated in FIG. 3, a mesh structure molded into a cylindrical shape is disposed inside the reaction suppression unit 6 as a first reaction-suppressing material 7. In FIG. 3, the outer diameter of the mesh structure is substantially the same as the inner diameter of the reaction suppression unit (pipe) 6.

The first reaction-suppressing material 7 is preferably disposed to enable continuous contact with the refrigerant from the time the refrigerant is discharged from the compressor 2 until it flows into the condenser 3. In other words, the mesh structure is preferably disposed along the entire length of the pipes that connect the compressor 2 to the condenser 3 (including the discharge pipe and the inflow pipe).

The inner surface of the reaction suppression unit 6 is preferably coated with a second reaction-suppressing material. The second reaction-suppressing material comprises at least one material selected from the group consisting of copper, iron, aluminum, nickel, titanium, metallic silicon, silicon steel, tin, magnesium and zinc as the main component. The second reaction-suppressing material can be coated onto the inner surface of the reaction suppression unit 6 by plating, coating, or vapor deposition or the like. As a result, even if the first reaction-suppressing material is only provided on a portion of the inside of the reaction suppression unit 6, the refrigerant is still able to contact a reaction-suppressing material.

Next is a description of the operation of the heat pump device 1.

The refrigerant used to fill the heat pump device 1 is compressed in the compressor 2 and becomes a high-temperature, high-pressure gas. The compressed refrigerant is discharged from the discharge port of the compressor 2. In the heat pump device 1, the refrigerant reaches its highest temperature at the discharge port of the compressor 2.

The discharged refrigerant passes through the reaction suppression unit 6 and flows into the condenser 3. During passage through the reaction suppression unit 6, the refrigerant can make contact with the reaction-suppressing materials (the first reaction-suppressing material and the second reaction-suppressing material). As a result, any increase in the abundance of the HFO-trans isomer or HCFO-trans isomer in the refrigerant can be suppressed.

The refrigerant that has passed through the reaction suppression unit 6 enters the condenser 3. The refrigerant entering the condenser 3 is condensed, and becomes a high-temperature, high-pressure refrigerant liquid, albeit having a lower temperature than the gas discharged from the compressor 2.

The condensed refrigerant is subjected to adiabatic expansion by the expansion valve 4, and becomes a low-temperature, low-pressure refrigerant liquid. The adiabatically expanded refrigerant is supplied to the evaporator 5, and is evaporated to form a low-temperature, low-pressure gas. The evaporated refrigerant is then drawn into the compressor 2, and the same cycle is then repeated.

In the heat pump device 1 according to the present embodiment, by providing the reaction suppression unit 6 in the region between the compressor 2 and the condenser 3, the isomerization reaction of the refrigerant (HFO-cis isomer or HCFO-cis isomer) is suppressed, and a stable thermal cycle can be maintained.

In the case where the reaction suppression unit 6 is connected directly to the compressor 2, as illustrated in FIG. 2, appropriate maintenance of the reaction suppression unit (such as replacing the reaction-suppressing material) can be performed during overhauls, or when the refrigerant is extracted to conduct maintenance work.

Second Embodiment

Figure 4:
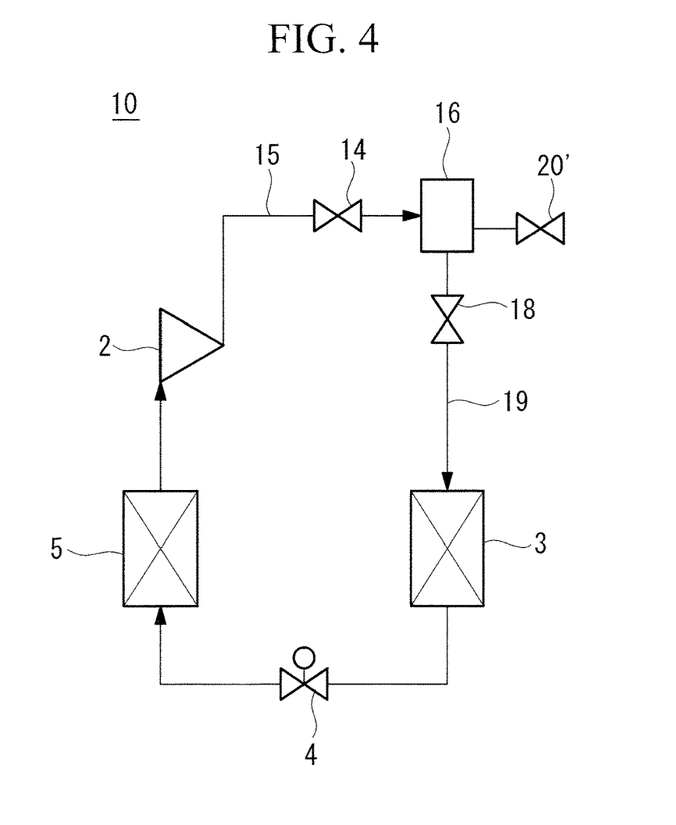
FIG. 4 A schematic structural diagram illustrating one example of a heat pump device according to a second embodiment.
Figure 5:
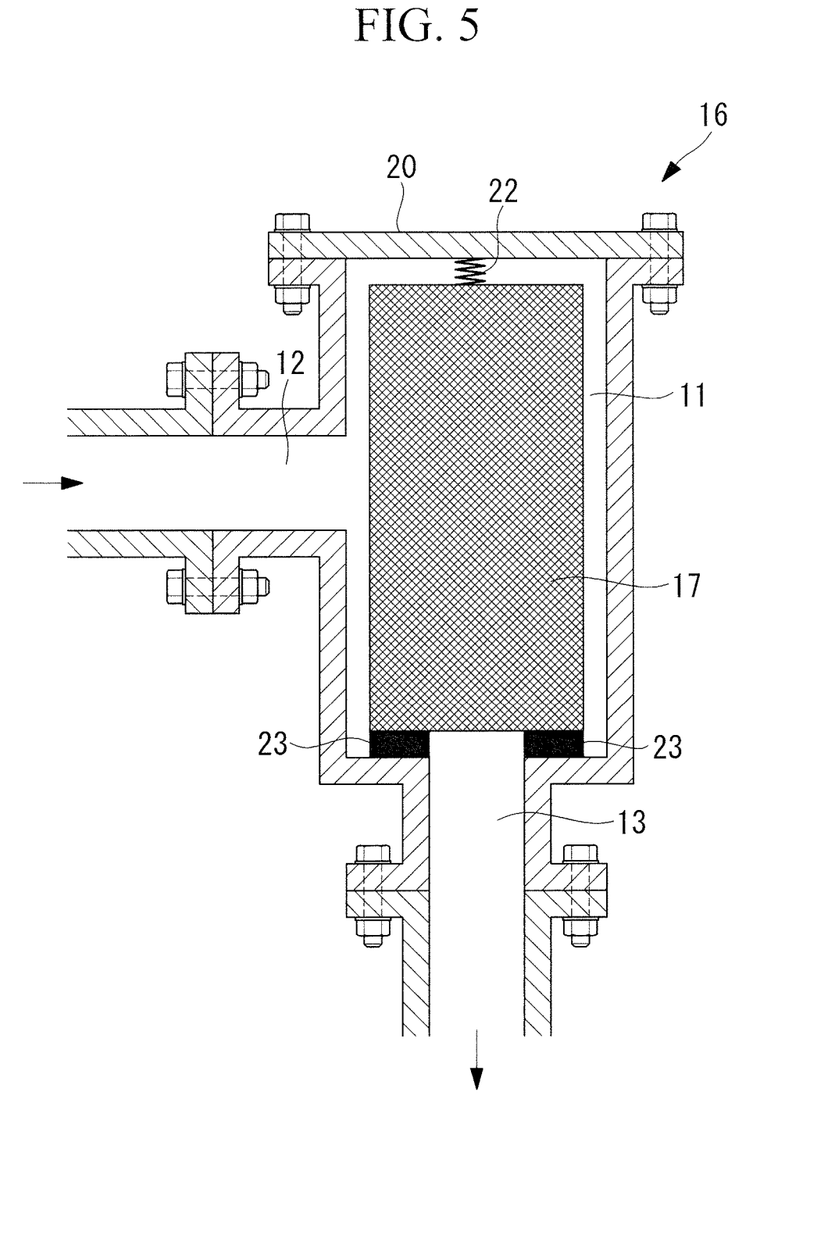
FIG. 5 A cross-sectional view of the reaction suppression unit shown in FIG. 4.
Figure 6:
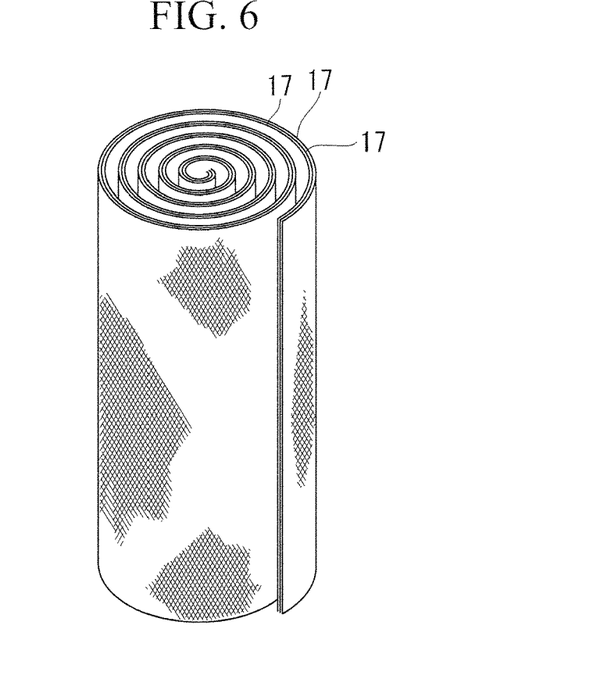
FIG. 6 A perspective view illustrating one example of a reaction-suppressing material.
Figure 7:
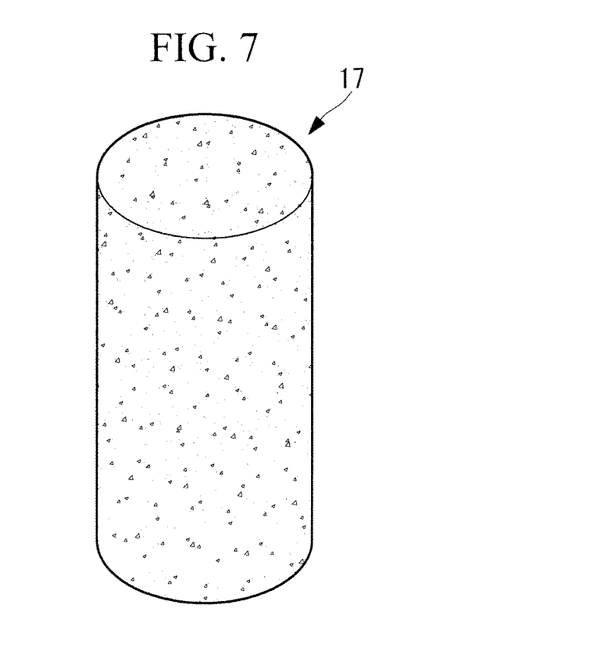
FIG. 7 A perspective view illustrating another example of a reaction-suppressing material.

Unless specifically described otherwise, the structure of the heat pump device according to this embodiment is the same as that of the first embodiment. FIG. 4 is a schematic structural diagram illustrating one example of a heat pump device (refrigerant circulation device) according to this embodiment. FIG. 5 is a cross-sectional view of the reaction suppression unit. FIG. 6 and FIG. 7 are perspective views illustrating examples of the reaction-suppressing material.

A reaction suppression unit 16 is connected in series within the pipes connecting the compressor 2 to the condenser 3. The reaction suppression unit 16 has a storage chamber 11, a refrigerant inlet 12, and a refrigerant outlet 13. The storage chamber 11 has a pressure vessel construction, and houses a first reaction-suppressing material 17 that is able to make contact with the refrigerant. The storage chamber 11 is secured to the condenser 3 of the heat pump device or to a frame installed nearby. The refrigerant inlet 12 is connected to a discharge pipe 15 via a valve 14. The refrigerant inlet 12 guides all of the refrigerant discharged from the compressor 2 into the storage chamber 11. The refrigerant inlet 12 has a structure that causes the refrigerant (gas) to flow smoothly with a swirling motion from the inlet toward the interior. The flow path cross-section of the refrigerant inlet 12 is a structure having a flow path surface area that is sufficiently large to prevent refrigerant (gas) loss. The refrigerant outlet 13 is provided in a position that enables the refrigerant that has been guided into the storage chamber 11 to pass through the first reaction-suppressing material 17 and then flow out toward the condenser 3. The refrigerant outlet 13 is connected to an inflow pipe 19 via a valve 18.

The reaction suppression unit 16 preferably includes a maintenance section. In FIG. 5, a maintenance section 20 is provided in the reaction suppression unit 16. The maintenance section 20 is a lid member that closes an opening provided in the reaction suppression unit 16. The lid member is secured to the reaction suppression unit with bolts or the like. As illustrated in FIG. 4, a discharge valve may also be provided as a maintenance section 20' (for the sake of simplicity, this section is omitted in FIG. 5). Providing the maintenance section 20 simplifies maintenance of the reaction suppression unit 16 such as replacement of the first reaction-suppressing material 17.

The material of the first reaction-suppressing material 17 may be the same as that described in the first embodiment.

The first reaction-suppressing material 17 may be secured to the reaction suppression unit 16 using fixtures or the like. In FIG. 5, a fixture 22 is provided between the first reaction-suppressing material 17 and the maintenance section 20. The fixture 22 is a spring or the like. Separate fixtures 23 are provided between the first reaction-suppressing material 17 and the refrigerant outlet 13 side of the reaction suppression unit 16. These separate fixtures 23 are packers or sealing materials or the like.

FIG. 6 and FIG. 7 illustrate examples of the first reaction-suppressing material.

The first reaction-suppressing material 17 illustrated in FIG. 6 is a shape prepared by stacking and then winding a very fine wire mesh. When the first reaction-suppressing material is installed in the reaction suppression unit, the space factor inside the reaction suppression unit should be high enough to prevent inhibition of the refrigerant flow, and typically exceeds 95%.

The first reaction-suppressing material 17 illustrated in FIG. 7 is a cylindrical block having a porous structure. The first reaction-suppressing material 17 of FIG. 7 has a sponge-like structure, and is a solid of appropriate rigidity. The expression "appropriate rigidity" means that the structure has sufficient hardness to retain its original shape and not block the refrigerant flow path even when exposed to the refrigerant flow.

The inner surface of the reaction suppression unit 16 is preferably coated with a second reaction-suppressing material (not shown in the figures). The second reaction-suppressing material is the same as that described in the first embodiment. By providing this second reaction-suppressing material, the surface area across which the refrigerant can contact the reaction-suppressing materials can be broadened.

The inner surfaces of the discharge pipe 15 and the inflow pipe 19 may also be formed from, or coated with, the second reaction-suppressing material. This enables the inner surfaces of the discharge pipe 15 and the inflow pipe 19 to function as a portion of the reaction suppression unit.

In the heat pump device 10 according to the present embodiment, all of the refrigerant discharged from the compressor 2 is guided into the reaction suppression unit 16. The refrigerant can make contact with the reaction-suppressing material during passage through the reaction suppression unit 16. As a result, any increase in the abundance of isomers (such as the trans isomer) in the refrigerant can be suppressed.

The refrigerant that has passed through the reaction suppression unit 16 flows through the condenser 3, the expansion valve 4 and the evaporator 5 and is drawn into the compressor 2, and the same cycle is then repeated.

(Modification)

Figure 8:
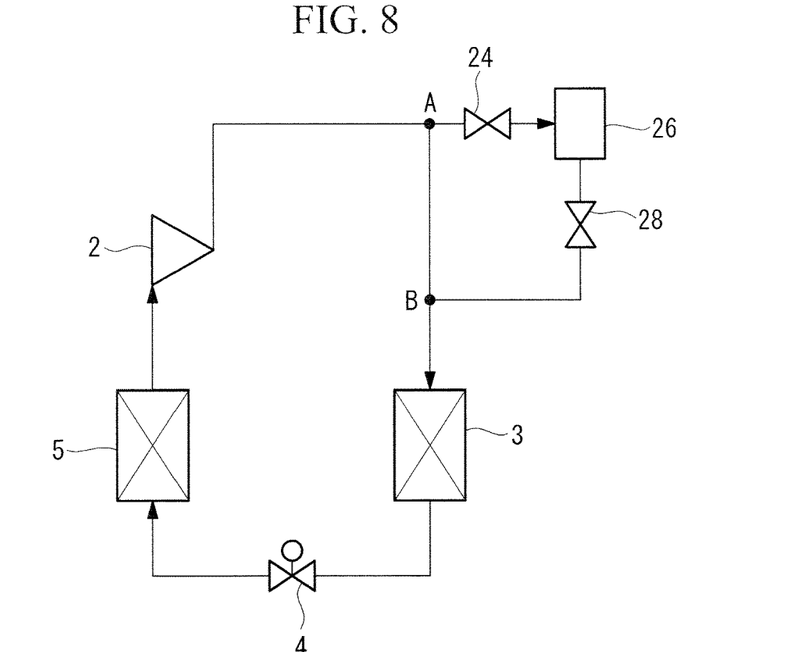
FIG. 8 A schematic structural diagram illustrating one example of a heat pump device according to a modification of the second embodiment.

FIG. 8 is a schematic structural diagram illustrating another example of the heat pump device (refrigerant circulation device) according to the present embodiment. The structure of this modification is the same as the second embodiment, with the exception of a different connection position for the reaction suppression unit.

A reaction suppression unit 26 is connected in parallel to the pipe connecting the compressor 2 and the condenser 3. A refrigerant inlet is connected to the upstream side A of the pipe via a valve 24. The refrigerant inlet can guide some or all of the refrigerant discharged from the compressor into the storage chamber. The amount of the refrigerant guided into the storage chamber can be adjusted by opening and closing the valve 24. A refrigerant outlet is provided in a position that enables the refrigerant that has been guided into the storage chamber to pass through the reaction-suppressing material and then flow out toward the condenser 3. The refrigerant outlet is connected to the downstream side B of the aforementioned pipe via a valve 28. Forming this small circuit simplifies replacement and maintenance of the reaction suppression unit.

The refrigerant outlet may also be designed so that the refrigerant flows directly into the condenser 3.

In the heat pump device according to the present embodiment, a portion of the refrigerant discharged from the compressor 2 is diverted and guided into the reaction suppression unit 26. For example, from the point A in the pipe connecting the compressor 2 and the condenser 3, 2% by volume of the refrigerant circulating through the heat pump cycle is diverted and guided into the storage chamber of the reaction suppression unit 26. The refrigerant introduced into the storage chamber can be brought into contact with the reaction-suppressing materials (the first reaction-suppressing material and the second reaction-suppressing material). As a result, any increase in the abundance of the trans isomer in the refrigerant can be suppressed.

The refrigerant that has passed through the reaction suppression unit 26 flows through the condenser 3, the expansion valve 4 and the evaporator 5 and is drawn into the compressor 2, and the same cycle is then repeated.

Third Embodiment

Figure 9:
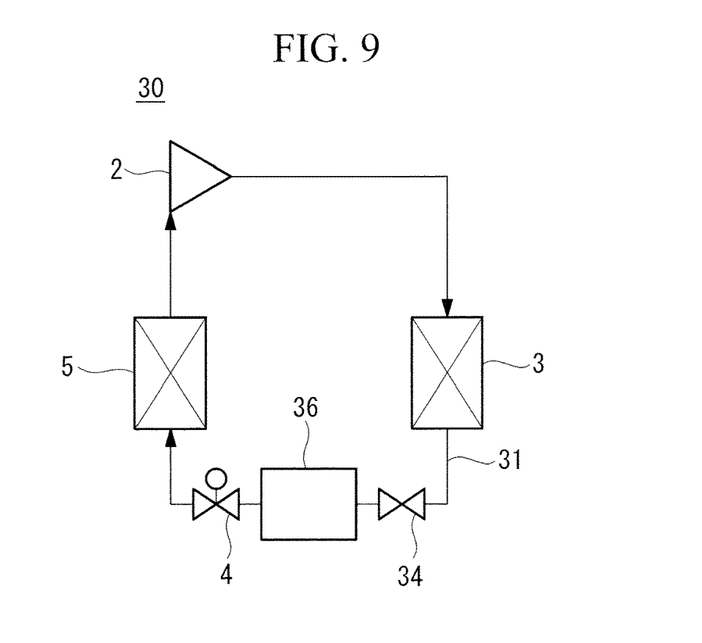
FIG. 9 A schematic structural diagram illustrating one example of a heat pump device according to a third embodiment.

In a heat pump device according to this embodiment, the reaction suppression unit is provided between the condenser and the expansion valve, and is not provided between the compressor and the condenser. The remaining structure is the same as that of the first embodiment. FIG. 9 is a schematic structural diagram illustrating one example of the heat pump device (refrigerant circulation device) according to this embodiment.

A reaction suppression unit 36 is connected in series between the condenser 3 and the expansion valve 4.

The reaction suppression unit 36 comprises a storage chamber, a refrigerant inlet and a refrigerant outlet. The refrigerant inlet is connected to an outflow pipe 31 via a valve 34. The refrigerant inlet guides all of the refrigerant flowing from the condenser 3 into the storage chamber. The storage chamber is formed from a pressure-resistant container, and houses a first reaction-suppressing material that is able to make contact with the refrigerant. The material for the first reaction-suppressing material is the same as that described in the first embodiment. The first reaction-suppressing material is preferably a porous structure, a mesh structure or a corrugated structure. The first reaction-suppressing material is disposed inside a space that is sufficiently large so as not to accelerate the flow of the refrigerant, and is disposed so as to agitate the flow of the refrigerant, thus enabling a large amount of the refrigerant to make contact with the surface of the first reaction-suppressing material. The refrigerant outlet is designed so that the refrigerant introduced into the storage chamber flows through the first reaction-suppressing material and then flows out toward the expansion valve 4.

The refrigerant is condensed by the condenser 3 and liquefied. The liquefied refrigerant occupies a smaller volume than the gaseous refrigerant. By providing the reaction suppression unit 36 between the condenser 3 and the expansion valve 4, a larger proportion of the refrigerant can be brought into contact with the reaction-suppressing material.

In a similar manner to the first embodiment, the inner surface of the reaction suppression unit 36 is preferably coated with a second reaction-suppressing material.

The inner surfaces of the pipes connecting the condenser 3 and the expansion valve 4 are also preferably coated with the second reaction-suppressing material.

In the heat pump device 30 according to the present embodiment, the refrigerant discharged from the compressor 2 flows into the condenser 3, and then flows out of the condenser 3 and is guided into the reaction suppression unit 36. During passage through the reaction suppression unit 36, the refrigerant can make contact with the reaction-suppressing materials. As a result, any increase in the abundance of the HFO-trans isomer or HCFO-trans isomer in the refrigerant can be suppressed.

The refrigerant that has passed through the reaction suppression unit 36 flows through the expansion valve 4 and the evaporator 5 and is drawn into the compressor 2, and the same cycle is then repeated.

In the present embodiment, the reaction suppression unit 36 is connected in series within the pipes connecting the condenser 3 and the expansion valve 4, but the reaction suppression unit 36 may also be connected in parallel, in a similar manner to the aforementioned modification of the second embodiment.

Fourth Embodiment

In a refrigerant circulation device according to this embodiment, the reaction suppression unit is integrated within the condenser, and is not provided between the compressor and the condenser. Other structures not described below are the same as those described in the first embodiment.

Figure 10:
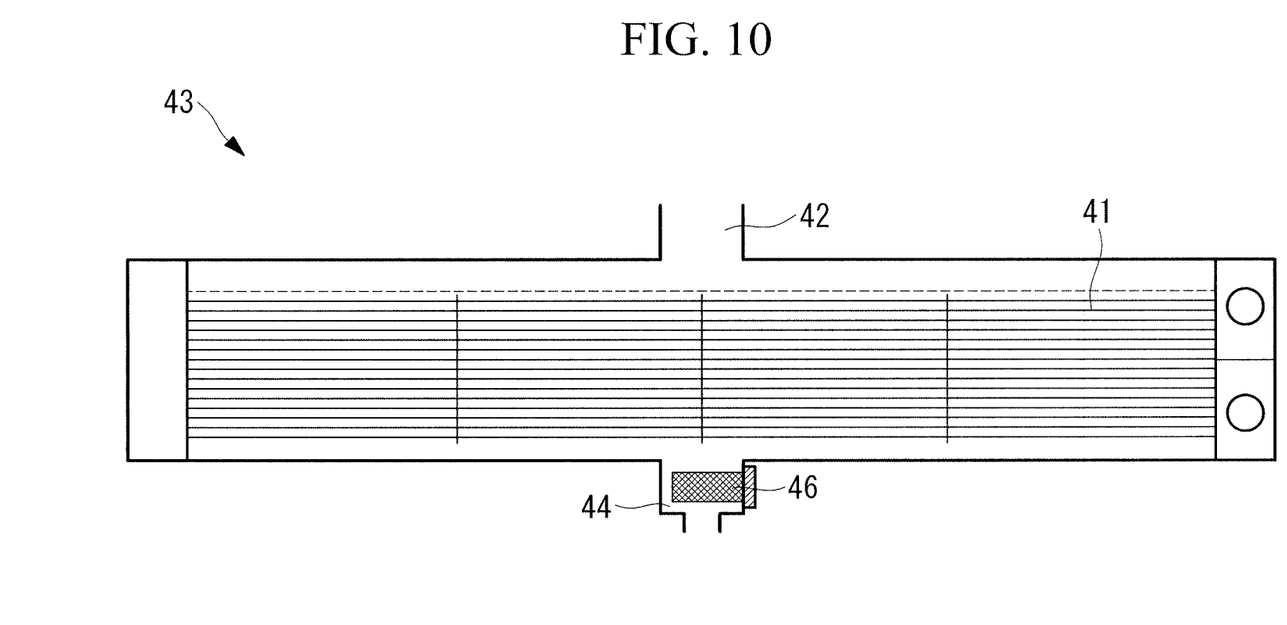
FIG. 10 A longitudinal sectional view of a condenser of a heat pump device according to a fourth embodiment.

FIG. 10 is a longitudinal sectional view illustrating the condenser of the refrigerant circulation device (heat pump device) according to this embodiment. A condenser 43 is a shell and tube heat exchanger. The condenser 43 comprises a plurality of heat transfer tubes 41, a refrigerant inlet pipe 42 and a refrigerant outlet pipe 44. The plurality of heat transfer tubes 41 are arranged horizontally, and a coolant fluid flows through the inside of these tubes. The refrigerant enters from the refrigerant inlet pipe 42, undergoes heat exchange with the coolant fluid flowing through the heat transfer tubes 41, and is then discharged from the refrigerant outlet pipe 44. In the present embodiment, a reaction suppression unit 46 is provided in the refrigerant outlet pipe 44. At the outlet from the condenser 43, the refrigerant (liquid) exists in a state that fills the refrigerant outlet pipe 44, and therefore the reaction suppression unit 46 is installed immersed within the refrigerant (liquid). If the reaction suppression unit 46 inhibits the flow of the refrigerant, then under maximum load operation, the refrigerant (liquid) accumulates in the condenser 43, which can cause problems such as a deterioration in the performance of the heat pump. Accordingly, the reaction suppression unit 46 is preferably installed with an adequate provision of space. The reaction suppression unit 46 is simply the reaction-suppressing material itself. The reaction-suppressing material may use the same material as that described for the first reaction-suppressing material in the second embodiment.

By integrating the reaction suppression unit 46 within the condenser 43, a separate heat-resistant container need not be provided, meaning the heat pump device can be lightened.

In the embodiments described above, a single condenser is provided, but the invention is not limited to such configurations, and a plurality of condensers may be provided. In those cases when two or more condensers are provided, the reaction suppression units (36 and 46) in the third embodiment and the fourth embodiment respectively may be provided at any point between the condenser positioned at the most upstream position (closest to the compressor) and the expansion valve. For example, in a heat pump device comprising a first condenser, a second condenser and an expansion valve in that sequence following the compressor, the reaction suppression unit may be provided between the first condenser and the second condenser.

Figure 11:
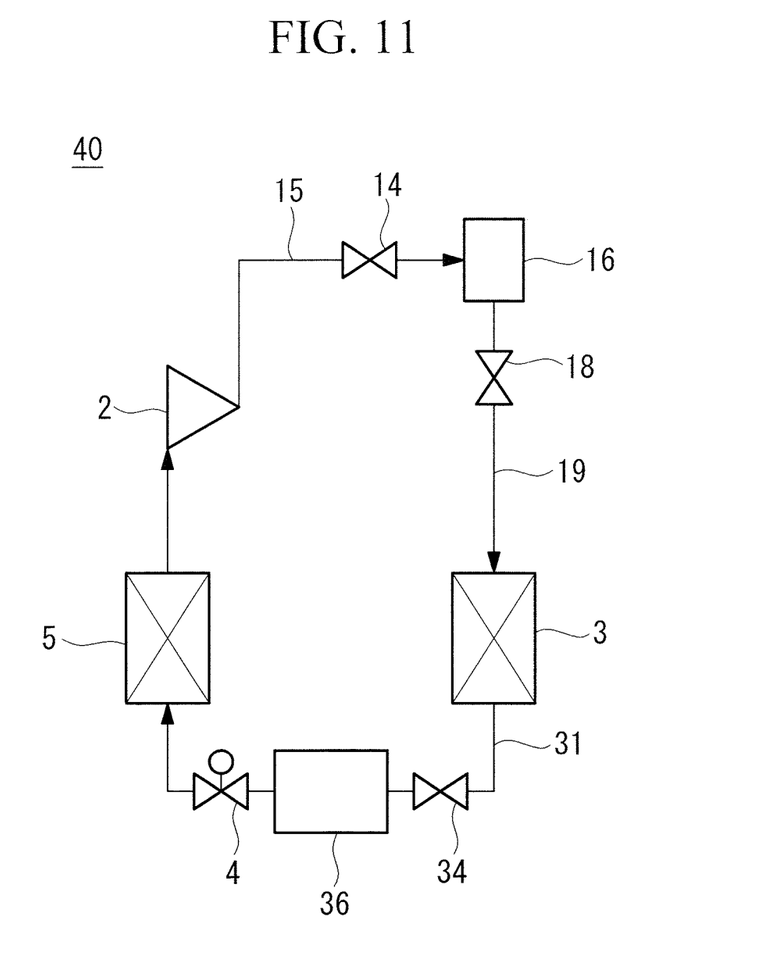
FIG. 11 A schematic structural diagram illustrating another example of a heat pump device.

Further, aspects of the first embodiment through to the fourth embodiment may be combined. For example, as illustrated in FIG. 11, reaction suppression units 16 and 36 may be provided between the compressor 2 and the condenser 3, and between the condenser 3 and the expansion valve 4 respectively.

Fifth Embodiment

Figure 12:
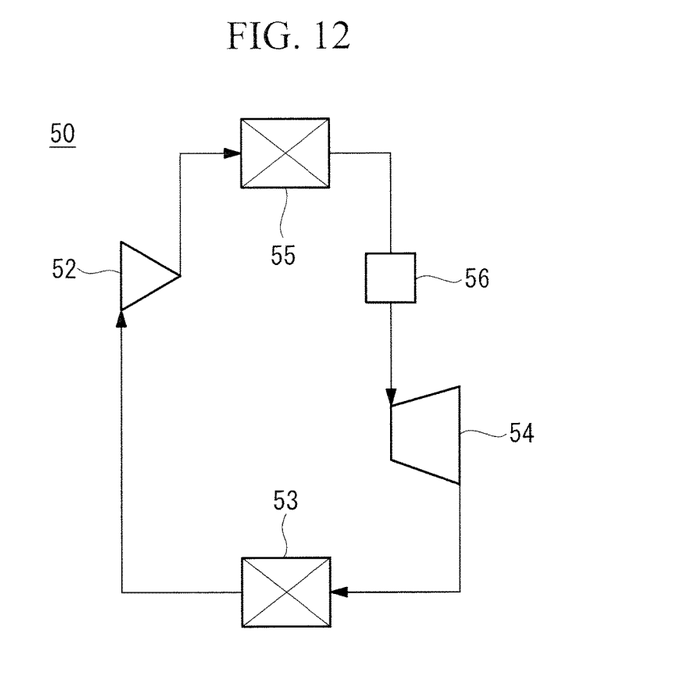
FIG. 12 A schematic structural diagram illustrating one example of an organic Rankine cycle device according to a fifth embodiment.

FIG. 12 is a schematic structural diagram illustrating one example of an organic Rankine cycle device (refrigerant circulation device) according to this embodiment.

The organic Rankine cycle device 50 comprises a pump 52, an evaporator 55, an expansion device 54, a condenser 53, and a reaction suppression unit 56. The pump 52, the evaporator 55, the expansion device 54 and the condenser 53 are connected in sequence by pipes, and form a refrigerant circulation circuit (organic Rankine cycle). Each of the structural components of this organic Rankine cycle device are designed to be able to withstand the pressure from the refrigerant. An HFO-cis isomer similar to that described in the first embodiment fills the inside of the organic Rankine cycle as the refrigerant.

The pump 52 force feeds the refrigerant flowing out of the condenser 53 toward the evaporator 55.

The evaporator 55 can heat and evaporate the force fed low-temperature, high-pressure refrigerant using an external heat source. The heat source may be the exhaust gas or the like from a turbine or engine, and can increase the temperature of the refrigerant to 175° C. or higher. The evaporator 55 may be a boiler or an evaporator or the like.

The expansion device 54 expands the evaporated high-temperature, high-pressure refrigerant, thereby turning a turbine or the like, and driving a generator to generate electrical power.

The condenser 53 can cool and condense the high-temperature, low-pressure refrigerant that has been expanded in the expansion device 54, thus forming a refrigerant liquid. The condenser 53 may be a steam condenser or the like.

The reaction suppression unit 56 suppresses the isomerization reaction of the refrigerant. The reaction suppression unit 56 is provided in a region where the temperature of the refrigerant can reach 175° C. or higher. In the present embodiment, the region where the temperature of the refrigerant can reach 175° C. or higher is positioned between the evaporator 55 and the expansion device 54. The reaction suppression unit 56 includes at least a portion of the pipes connecting the evaporator 55 and the expansion device 54. The reaction suppression unit 56 preferably includes all of the pipes connecting the evaporator 55 and the expansion device 54.

The reaction suppression unit 56 contains the same first reaction-suppressing material as that described in the first embodiment.

The first reaction-suppressing material is preferably disposed to enable continuous contact with the refrigerant from the time the refrigerant is discharged from the evaporator 55 until it flows into the expansion device 54. In other words, the first reaction-suppressing material is preferably disposed along the entire length of the pipes that connect the evaporator 55 to the expansion device 54.

In a similar manner to the first embodiment, the inner surface of the reaction suppression unit 56 is preferably coated with a second reaction-suppressing material.

Next is a description of the operation of the organic Rankine cycle device 50.

The refrigerant used to fill the organic Rankine cycle device 50 is heated in the evaporator 55 by an external heat source, and converted to a high-temperature, high-pressure vapor. In the organic Rankine cycle device 50, the temperature of the refrigerant is highest at the outlet from the evaporator 55.

The vapor passes through the reaction suppression unit 56 and flows into the expansion device 54. During passage through the reaction suppression unit 56, the refrigerant can make contact with the reaction-suppressing materials (the first reaction-suppressing material and the second reaction-suppressing material). As a result, any increase in the abundance of the HFO-trans isomer or HCFO-trans isomer in the refrigerant can be suppressed.

The refrigerant is subjected to adiabatic expansion by the expansion device 54, and the resulting work that is generated is used to drive a turbine. The expanded refrigerant flows into the condenser 53, and is cooled to form a liquid. The condensed refrigerant is then drawn into the pump 52, and the same cycle is repeated.

<HFO Isomerization Reaction>

The ability of the reaction-suppressing materials to suppress the isomerization reaction of the refrigerant (HFO-cis isomer) was confirmed by the following test.

The test was performed using the method prescribed for the sealed tube test in JIS K2211.

The refrigerant used was HFO1234ze(Z) (manufactured by Central Glass Co., Ltd., purity: 99.8%).

The reaction-suppressing materials tested were iron (Fe), copper (Cu), aluminum (Al), SUS304, SUS316, zeolite, and a mixture containing equal volumes of iron, copper and aluminum. The iron was a material prescribed in JIS C 2504, and a test piece having a diameter of 1.60 mm and a length of 50 mm was used. The copper was a material prescribed in JIS C 3102, and a test piece having a diameter of 1.60 mm and a length of 50 mm was used. The aluminum was a material prescribed in JIS H 4040, and a test piece having a diameter of 1.60 mm and a length of 50 mm was used. For the SUS304 and SUS316, JIS austenitic stainless steel test pieces were used. For the zeolite, Zeolum A3 (9-14#) manufactured by Tosoh Corporation was used. Each of the reaction-suppressing materials was subjected to a degreasing treatment and a polishing treatment prior to testing to ensure a fresh surface.

Each of the reaction-suppressing materials was placed in a Pyrex (a registered trademark) glass tube (diameter 10 mm×inner diameter 8 mm×length 200 mm) with 0.5 g of the refrigerant, and the glass tube was sealed. When the reaction-suppressing material was a single metal, three test pieces were used, whereas when the three metals were mixed, one test piece of each metal was used.

Each of the sealed glass tubes was heated at a test temperature of 175° C. to 250° C. for 14 days. After 14 days, the refrigerant was analyzed using a gas chromatograph (GC-2010 plus, manufactured by Shimadzu Corporation) fitted with a flame ionization detector (FID). Further, the external appearance of the refrigerant before and after testing was also evaluated visually.

For comparison, the same tests were performed using 1,1,1,3,3-pentafluoropropane (HFC245fa) as the refrigerant. The results of the FID analyses are shown in Table 1.

TABLE 1

| Sample No. | Test temperature [° C.] | Reaction-suppressing material | Purity [GC %] | trans isomer [GC %] |
|---|---|---|---|---|
| 1 | 175 | — | 99.8 | 0.0 |
| 2 | | Fe, Cu, Al | 99.7 | 0.1 |
| 3 | 200 | — | 97.2 | 2.5 |
| 4 | | Fe, Cu, Al | 99.6 | 0.2 |
| 5 | 225 | — | 81.1 | 18.4 |
| 6 | | Fe, Cu, Al | 97.3 | 2.4 |
| 7 | 250 | — | 75.2 | 24.1 |
| 8 | | Fe, Cu, Al | 96.3 | 3.3 |
| 9 | | Fe | 82.0 | 17.1 |
| 10 | | Cu | 83.4 | 15.9 |
| 11 | | Al | 96.1 | 3.5 |
| 12 | | SUS304 | 73.2 | 26.0 |
| 13 | | SUS316 | 72.3 | 26.8 |
| 14 | | Zeolite A3 | 93.5 | 5.9 |

The purity of the HFC245fa heated at a test temperature of 175° C. to 250° C. was higher than 99.9 GC % in each case. These results confirmed that HFC245fa had good thermal stability at temperatures not higher than 250° C.

Figure 13:
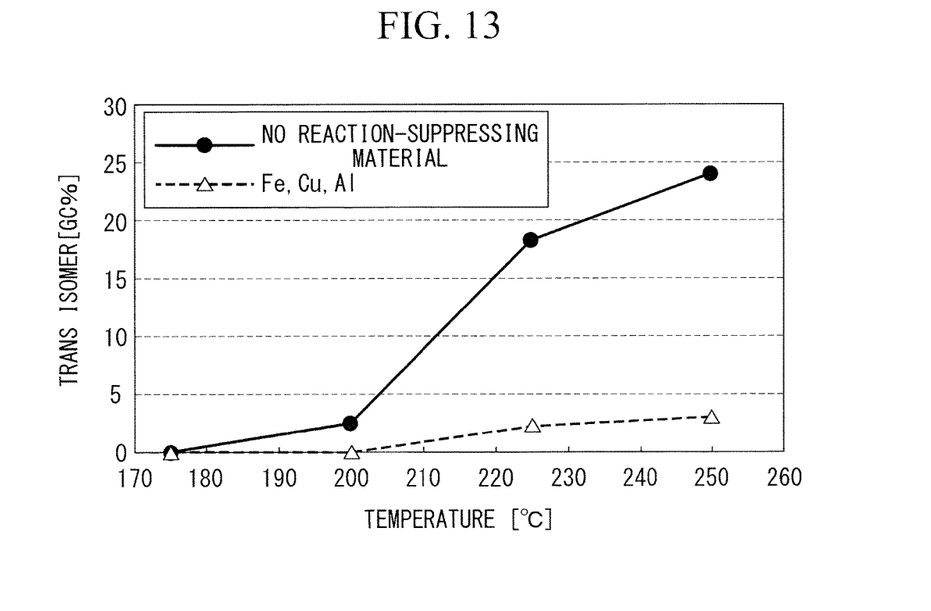
FIG. 13 A graph illustrating the change history for the abundance of the HFO-trans isomer in a refrigerant.

FIG. 13 illustrates the change history for the abundance of the HFO-trans isomer in the refrigerant. In the figure, the horizontal axis represents the test temperature (° C.), the vertical axis represents the HFO-trans isomer abundance (GC %), the solid line indicates the results for a sample with no reaction-suppressing material, and the dashed line indicates the results for a sample with a reaction-suppressing material. At a test temperature of 175° C., the HFO1234ze(Z) maintained a purity of at least 99 GC % regardless of the presence or absence of a reaction-suppressing material. However, when the test temperature was increased above 175° C., the abundance of the trans isomer in the refrigerant increased. In particular, when the test temperature exceeded 200° C., the isomerization reaction exhibited an accelerating trend.

From these results, it was evident that if HFO1234ze(Z) was to be used as a refrigerant at an operating temperature of 175° C. or higher, a countermeasure for the isomerization reaction was necessary.

In the absence of a reaction-suppressing material, the amount of the trans isomer in the refrigerant increased to 18.4 GC % in sample No. 5 (test temperature: 225° C.), and increased to 24.1 GC % in sample No. 7 (test temperature: 250° C.). In sample No. 12 and sample No. 13, the abundance of the trans isomer in the refrigerant was 26.0 GC % and 26.8 GC % respectively. These values are similar to sample No. 7 in which no reaction-suppressing material existed. In contrast, in sample Nos. 8, 9, 10 and 11, the abundance of the trans isomer in the refrigerant was suppressed to a lower level than that observed in sample No. 7. The abundance of the trans isomer in the refrigerant was 3.3 GC % in sample No. 8 (test temperature: 250° C.), and 3.5 GC % in sample No. 11 (test temperature: 250° C.). These results confirmed that by incorporating a reaction-suppressing material in the refrigerant, the isomerization reaction of HFO1234ze(Z) could be suppressed in high-temperature environments of at least 175° C. but not more than 250° C. The mixture of equal volumes of iron, copper and aluminum, or aluminum or zeolite were confirmed as the best reaction-suppressing materials.

Further, when a reaction-suppressing material was incorporated within the refrigerant, the purity of the HFO1234ze(Z) in sample No. 8 (test temperature: 250° C.) was 96.3 GC %. In contrast, the purity of the HFO1234ze(Z) from the test performed at the same test temperature but in the absence of a reaction-suppressing material was 75.2 GC %. These results confirmed that by incorporating a reaction-suppressing material in the refrigerant, the isomerization reaction could be suppressed, and any reduction in the purity of the HFO1234ze(Z) could also be suppressed.

In the samples that included a reaction-suppressing material, there was no change in the external appearance of the refrigerant before and after testing, both the refrigerant and the glass tube maintained a colorless and transparent appearance, and no production of unwanted matter such as sludge was observed.

REFERENCE SIGNS LIST 1, 10, 30, 40 Heat pump device (refrigerant circulation device)
2 Compressor
3, 43 Condenser
4 Expansion valve
5 Evaporator
6, 16, 26, 36, 46, 56 Reaction suppression unit
7, 17 First reaction-suppressing material
14, 18, 24, 28, 34 Valve
15 Discharge pipe
19 Inflow pipe
20, 20' Maintenance section
31 Outflow pipe
41 Heat transfer tube
42 Refrigerant inlet pipe
44 Refrigerant outlet pipe
50 Organic Rankine cycle device (refrigerant circulation device)
52 Pump
53 Condenser
54 Expansion device
55 Evaporator

The invention claimed is:

1. A refrigerant circulator, comprising:
a refrigerant including a hydrofluoroolefin or hydrochlorofluoroolefin having a carbon-carbon double bond within a molecular structure;
a refrigerant circulation circuit including:
a compressor that compresses the refrigerant,
a condenser that condenses the compressed refrigerant,
an expansion valve that expands the condensed refrigerant, and
an evaporator that evaporates the expanded refrigerant; and
a reaction suppressor which suppresses an isomerization reaction of the refrigerant and which is provided within the refrigerant circulation circuit,
wherein the reaction suppressor includes a reaction-suppressing material containing at least one material selected from the group consisting of copper, iron, aluminum, titanium, metallic silicon, silicon steel, tin, magnesium and zinc, and
the reaction-suppressing material is disposed to enable contact with the refrigerant.

2. The refrigerant circulator according to claim 1, wherein the refrigerant comprises a hydrofluoroolefin or hydrochlorofluoroolefin having a carbon-carbon double bond within a molecular structure as a main component.

3. The refrigerant circulator according to claim 1, wherein the refrigerant comprises a cis isomer of a hydrofluoroolefin or hydrochlorofluoroolefin having a carbon-carbon double bond within a molecular structure as a main component.

4. The refrigerant circulator according to claim 1, wherein the reaction suppressor suppresses an isomerization reaction of a cis isomer of the refrigerant to a trans isomer.

5. The refrigerant circulator according to claim 1, wherein the reaction-suppressing material comprises a structure containing a mixture of copper, iron and stand-alone aluminum.

6. The refrigerant circulator according to claim 1, wherein the reaction-suppressing material is a porous structure, a mesh structure or a corrugated structure.

7. The refrigerant circulator according to claim 1, wherein the refrigerant circulation circuit has a region where a temperature of the refrigerant reaches 175° C. or higher, and
the reaction suppressor is provided in the region where the temperature of the refrigerant reaches 175° C. or higher.

8. The refrigerant circulator according to claim 1, wherein the reaction suppressor is provided in a region from the compressor to the condenser.

9. The refrigerant circulator according to claim 1, comprising
an evaporator which evaporates the expanded refrigerant, wherein
the reaction suppression unit is provided in a region from the condenser to the expansion valve.

10. The refrigerant circulator according to claim 9, wherein
the reaction suppression unit is integrated within the condenser.

11. The refrigerant circulator according to claim 1, comprising
a pump which force feeds the refrigerant,
the reaction suppression unit is provided in the region from the evaporator to the expansion device.

12. The refrigerant circulator according to claim 1, wherein
the reaction-suppressing material comprises stand-alone aluminum.

13. A method for suppressing isomerization, comprising:
providing a refrigerant circulation circuit that includes, a compressor that compresses the refrigerant, a condenser that condenses the compressed refrigerant, an expansion valve that expands the condensed refrigerant, and an evaporator that evaporates the expanded refrigerant;
providing a refrigerant that includes a hydrofluoroolefin or hydrochlorofluoroolefin having a carbon-carbon double bond within a molecular structure;
providing, in the refrigerant circulation circuit, a reaction suppressor including
a reaction-suppressing material that contains at least one material selected from the group consisting of copper, iron, aluminum, titanium, metallic silicon, silicon steel, tin, magnesium and zinc, and that suppresses an isomerization reaction of the refrigerant is provided within a refrigerant circulation circuit, and
bringing the refrigerant into contact with the reaction-suppressing material.

14. The method for suppressing isomerization according to claim 13, wherein
the refrigerant comprises a hydrofluoroolefin or hydrochlorofluoroolefin having a carbon-carbon double bond within a molecular structure as a main component.

15. The method for suppressing isomerization according to claim 13, wherein
the reaction suppressor contains a reaction-suppressing material that suppresses an isomerization reaction of a cis isomer of the refrigerant to a trans isomer.

16. A method for circulating a refrigerant, comprising:
providing a refrigerant circulation circuit that includes, a compressor that compresses the refrigerant, a condenser that condenses the compressed refrigerant, an expansion valve that expands the condensed refrigerant, and an evaporator that evaporates the expanded refrigerant;
providing a
refrigerant that includes a hydrofluoroolefin or hydrochlorofluoroolefin having a carbon-carbon double bond within the molecular structure;
providing a reaction suppressor including a reaction-suppressing material that contains at least one material selected from the group consisting of copper, iron, aluminum, titanium, metallic silicon, silicon steel, tin, magnesium and zinc, and that suppresses an isomerization reaction of the refrigerant is provided within a refrigerant circulation circuit, and
bringing the refrigerant into contact with the reaction-suppressing material.

17. The method for circulating a refrigerant according to claim 16, wherein
the refrigerant comprises a hydrofluoroolefin or hydrochlorofluoroolefin having a carbon-carbon double bond within a molecular structure as a main component.

18. The method for circulating a refrigerant according to claim 16, wherein
the reaction suppressor contains a reaction-suppressing material that suppresses an isomerization reaction of a cis isomer of the refrigerant to a trans isomer.

* * * * *